(12) United States Patent
Uruma (10) Patent No.: US 9,154,664 B2
(45) Date of Patent: Oct. 6, 2015

(54) RECEIVER IMAGE PROCESSING APPARATUS, CAPABLE OF POST-PROCESSING, AND CONTROL METHOD AND STORAGE MEDIUM THEREFOR

(75) Inventor: Kazuhiro Uruma, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 447 days.

(21) Appl. No.: 13/033,080

(22) Filed: Feb. 23, 2011

(65) Prior Publication Data

US 2011/0216329 A1 Sep. 8, 2011

(30) Foreign Application Priority Data

Mar. 4, 2010 (JP) ................................. 2010-047332

(51) Int. Cl.
*G06K 15/02* (2006.01)
*H04N 1/333* (2006.01)
*H04N 1/32* (2006.01)

(52) U.S. Cl.
CPC ........ *H04N 1/33315* (2013.01); *H04N 1/32016* (2013.01); *H04N 2201/0093* (2013.01); *H04N 2201/0094* (2013.01); *H04N 2201/33321* (2013.01); *H04N 2201/33392* (2013.01)

(58) Field of Classification Search
CPC .......... H04N 1/32016; H04N 1/33315; H04N 2201/0093; H04N 2201/0094; H04N 2201/33321; H04N 2201/33392
USPC .......................... 358/1.1, 1.12, 1.13, 1.15, 1.2
See application file for complete search history.

(56) References Cited

U.S. PATENT DOCUMENTS

| 2007/0057426 A1 | 3/2007 | Tao et al. | |
| 2008/0030756 A1* | 2/2008 | Carney et al. | 358/1.13 |
| 2008/0316517 A1* | 12/2008 | Sato | 358/1.15 |
| 2009/0303503 A1* | 12/2009 | Otake et al. | 358/1.13 |

FOREIGN PATENT DOCUMENTS

| GB | 2402837 A | 12/2004 |
| JP | 06-303345 A | 10/1994 |
| JP | 06-334880 A | 12/1994 |

OTHER PUBLICATIONS

English Machine Translation of JP H06-334880 (Sakayama et al., Published Dec. 2, 1994).*
European Search Report issued in European counterpart application No. 11156736.8, dated Mar. 12, 20013.

* cited by examiner

*Primary Examiner* — Ngon Nguyen
*Assistant Examiner* — Juan M Guillermety
(74) *Attorney, Agent, or Firm* — Rossi, Kimms & McDowell LLP (57) ABSTRACT

A receiver image processing apparatus capable of easily performing post-processing in line with a print setting. The receiver image processing apparatus includes a printing unit able to print image data on a plurality of types of sheets of different sizes. When an incoming call arrives from a sender image processing apparatus, a determination unit of the apparatus determines whether a setting to perform post-processing on sheets by a post-processing unit has been made by a setting unit. If it is determined that the setting to perform post-processing has been made, a notification unit of the receiver image processing apparatus notifies size information representing a sheet size belonging to a predetermined series, as ability information of the apparatus, to the sender image processing apparatus.

19 Claims, 6 Drawing Sheets

PRINT SETTING
- STAPLE-PRINTING  DO — 301
                   DON'T — 302

| START TIME 401 | COUNTERPART ADDRESS 402 | ACCEPTANCE NUMBER 403 | COMMUNICATION MODE 404 | NUMBER OF PAGES 405 | ERROR CODE 406 | COMMUNICATION RESULT 407 |
|---|---|---|---|---|---|---|
| 2009/9/1 10:21 | 0441112222 | 0001 | TRANSMISSION | 1 | | OK |
| 2009/9/1 10:21 | 0311113333 | 5001 | RECEPTION | 1 | | OK |
| 2009/9/1 10:22 | 0441113333 | 0002 | TRANSMISSION | 1 | | OK |
| 2009/9/1 10:22 | 0311113333 | 5002 | RECEPTION | 1 | | OK |
| 2009/9/1 10:23 | 0311114444 | 5003 | RECEPTION | 1 | | OK |
| 2009/9/1 10:23 | 0311113333 | 5004 | RECEPTION | 1 | | OK |
| 2009/9/1 10:24 | 0441113333 | 5005 | RECEPTION | 1 | | OK |
| 2009/9/1 10:24 | 0311114444 | 5006 | RECEPTION | 1 | | OK |
| 2009/9/1 10:24 | 0311112222 | 5007 | RECEPTION | 0 | ##201 | NG |
| 2009/9/1 10:25 | 0441112222 | 0003 | TRANSMISSION | 1 | | OK |
| 2009/9/1 10:25 | 0441113333 | 0004 | TRANSMISSION | 1 | | OK |
| 2009/9/1 10:26 | 0311114444 | 5008 | RECEPTION | 1 | | OK |
| 2009/9/1 10:26 | 0322223333 | 5009 | RECEPTION | 0 | ##201 | NG |
| 2009/9/1 10:27 | 0441112222 | 0005 | TRANSMISSION | 1 | | OK |
| 2009/9/1 10:27 | 0441115555 | 0006 | TRANSMISSION | 1 | | OK |
| 2009/9/1 10:27 | 0441115555 | 0007 | TRANSMISSION | 1 | | OK |
| 2009/9/1 10:27 | 0311112222 | 5010 | RECEPTION | 1 | | OK |
| 2009/9/1 10:28 | 0311113333 | 5011 | RECEPTION | 1 | | OK |
| 2009/9/1 10:28 | 0311114444 | 5012 | RECEPTION | 1 | | OK |

FIG. 5

| | 501 | 502 | 503 | 504 | 505 | 506 | 507 |
|---|---|---|---|---|---|---|---|
| | NAME | TEL | F CODE | PWD | ECM | TX SPEED | DIS RESULT |
| | DESTINATION A | 0441110001 | | | ON | 33600 | OK |
| | DESTINATION B | 0441110002 | | | ON | 33600 | OK |
| | DESTINATION C | 0441110003 | | | ON | 33600 | OK |
| | DESTINATION D | 0441110004 | | | ON | 33600 | OK |
| | DESTINATION E | 0441110005 | | | ON | 33600 | OK |
| | DESTINATION F | 0441110006 | | | OFF | 33600 | OK |
| | DESTINATION G | 0441110007 | | | ON | 14400 | OK |
| | DESTINATION H | 0441110008 | | | ON | 33600 | OK |
| | DESTINATION I | 0441110009 | | | ON | 33600 | NG |
| | DESTINATION J | 0441110010 | | | ON | 33600 | OK |
| | DESTINATION K | 0441110011 | | | ON | 33600 | OK |
| | DESTINATION L | 0441110012 | | | ON | 33600 | OK |
| | DESTINATION M | 0441110013 | | | ON | 33600 | NG |
| | DESTINATION N | 0441110014 | | | ON | 33600 | OK |
| | DESTINATION O | 0441110015 | | | OFF | 14400 | OK |
| | DESTINATION P | 0441110016 | | | ON | 33600 | OK |
| | DESTINATION Q | 0441110017 | | | ON | 33600 | OK |
| | DESTINATION R | 0441110018 | | | ON | 33600 | OK |
| | DESTINATION S | 0441110019 | | | ON | 33600 | OK |

RECEIVER IMAGE PROCESSING APPARATUS, CAPABLE OF POST-PROCESSING, AND CONTROL METHOD AND STORAGE MEDIUM THEREFOR

BACKGROUND OF THE INVENTION

1. Field of the Invention

The present invention relates to a receiver image processing apparatus and a control method and a storage medium therefor.

2. Description of the Related Art

Conventionally, some of image processing apparatuses such as facsimile machines and digital multi-function peripherals are configured to be able to print a series of data received by facsimile communication on sheets and staple the printed sheets (hereinafter, referred to as staple-printing).

In the facsimile communication, data of various sizes and of various size series (such as A4 size, B4 size, and A3 size) are transmitted and received. A receiver image processing apparatus is capable of staple-printing a series of data of the same size as one another, but incapable of staple-printing a series of data of different sizes from one another without change of size. In other words, the size and size series must be made identical between a series of data in order to obtain a staple-printed product.

Japanese Laid-open Patent Publication No. 6-334880 discloses a facsimile machine that delivers a CSI command added with staple information upon arrival of an incoming call.

However, in a case where special information added with staple information as disclosed in Japanese Laid-open Patent Publication No. 6-334880 is transmitted and received, it is necessary for both a sender facsimile machine and a receiver facsimile machine to execute a process for handling the special information. In other words, the command delivery method disclosed in the Patent Publication is only applicable to communication between apparatuses each capable of handling the special information, and therefore lacks versatility.

Meanwhile, there is an idea to change data size on the side of the receiver apparatus in order to make a series of received data identical in size to one another. In that case, data is sometimes transmitted in a state where data size is large, resulting in increased communication time and increased communication fees.

As described above, conventional image processing apparatuses are unable to transmit and receive a series of data which are identical in size without executing a complicated communication process, causing a fear that a post-processing function such as a staple-printing function of the receiver apparatus cannot effectively be utilized.

SUMMARY OF THE INVENTION

The present invention provides a receiver image processing apparatus and a control method and a storage medium therefor, which are capable of easily performing post-processing in line with a print setting.

According to a first aspect of this invention, there is provided a receiver image processing apparatus configured to communicate with a sender image processing apparatus, which comprises a printing unit configured to be able to print data received from the sender image processing apparatus on a plurality of types of sheets of different sizes, a post-processing unit configured to perform post-processing on sheets printed by the printing unit, a setting unit configured to make a setting as to whether to perform post-processing on sheets, a determination unit configured, in a case where an incoming call arrives from the sender image processing apparatus, to determine whether a setting to perform post-processing on sheets by the post-processing unit has been made by the setting unit, and a notification unit configured to notify size information that represents a sheet size belonging to a predetermined series, as ability information of the receiver image processing apparatus, to the sender image processing apparatus in a case where it is determined that the setting to perform post-processing on sheets has been made.

According to a second aspect of this invention, there is provided a receiver image processing apparatus configured to communicate with a sender image processing apparatus, which comprises a discrimination unit configured, in a case where an incoming call arrives from the sender image processing apparatus, to discriminate whether a transfer mode has been set for data received from the sender image processing apparatus, a determination unit configured, in a case where it is discriminated by the discrimination unit that the transfer mode has been set, to determine whether a setting to perform post-processing on sheets by a post-processing apparatus has been made in print setting information acquired from a transfer destination image processing apparatus, and a notification unit configured to notify size information indicating a sheet size belonging to a predetermined series, as ability information of the transfer destination image processing apparatus, to the sender image processing apparatus in a case where it is determined by the determination unit that the setting to perform post-processing on sheets has been made in the print setting information.

According to a third aspect of this invention, there is provided a control method for the receiver image processing apparatus described in the first aspect.

According to a fourth aspect of this invention, there is provided a control method for the receiver image processing apparatus described in the second aspect.

According to a fifth aspect of this invention, there is provided a storage medium storing a program for causing a computer to execute the control method described in the third aspect.

According to a sixth aspect of this invention, there is provided a storage medium storing a program for causing a computer to execute the control method described in the fourth aspect.

With the present invention, the receiver image processing apparatus is able to easily perform post-processing in line with a print setting.

Further features of the present invention will become apparent from the following description of exemplary embodiments with reference to the attached drawings.

DESCRIPTION OF THE EMBODIMENTS

The present invention will now be described in detail below with reference to the drawings showing preferred embodiments thereof.

First Embodiment

Figure 1:
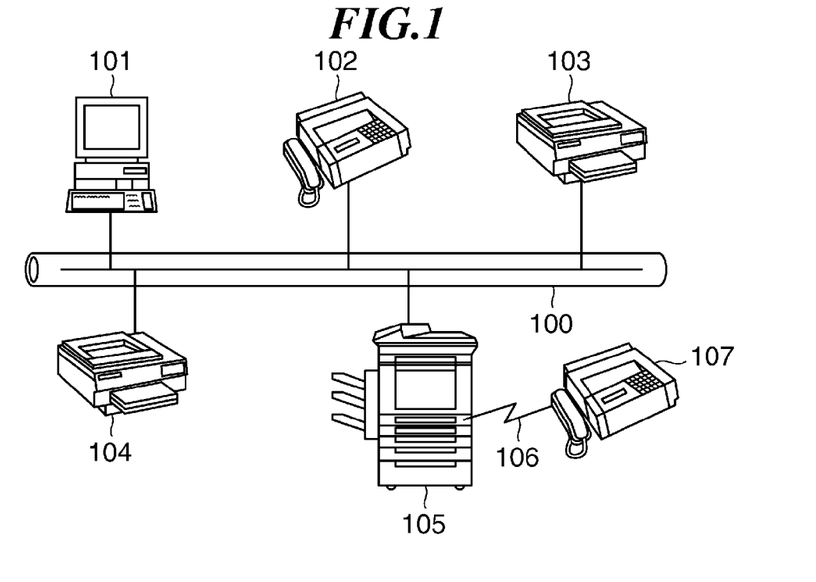
FIG. 1 is a schematic view showing a network system including a receiver image processing apparatus according to embodiments of this invention.

FIG. 1 schematically shows a network system including a receiver image processing apparatus according to embodiments of this invention.

Referring to FIG. 1, reference numeral 101 denotes a host computer connected to a network 100 and configured to output a printing request to a receiver image processing apparatus 105 connected to the network, 102 denotes a facsimile machine capable of performing Internet facsimile communication (such as IFAX reception), and 103, 104 denote printers each configured to accept a printing request (print job) from, e.g., the host computer 101. The image processing apparatus 105 is implemented by, e.g., an MFP (multifunction peripheral) having functions such as a copy function, data transmission function, and facsimile function. A facsimile machine 107 is connected to the image processing apparatus 105 via a PSTN line 106, which is a public network. Data communication is performed between the image processing apparatus 105 (receiver image processing apparatus) and the facsimile machine 107 (sender image processing apparatus), using a facsimile communication protocol such as that shown in FIG. 6. The image processing apparatus 105 is provided with sheet feed units (sheet feed cassettes) in which sheets of different sizes can be stored. It is assumed here that A4, A3, and B4 size sheets are stored in respective ones of the sheet feed units. The image processing apparatus 105 implemented by the MFP in this embodiment can be implemented by an SFP (single function peripheral).

Figure 2:
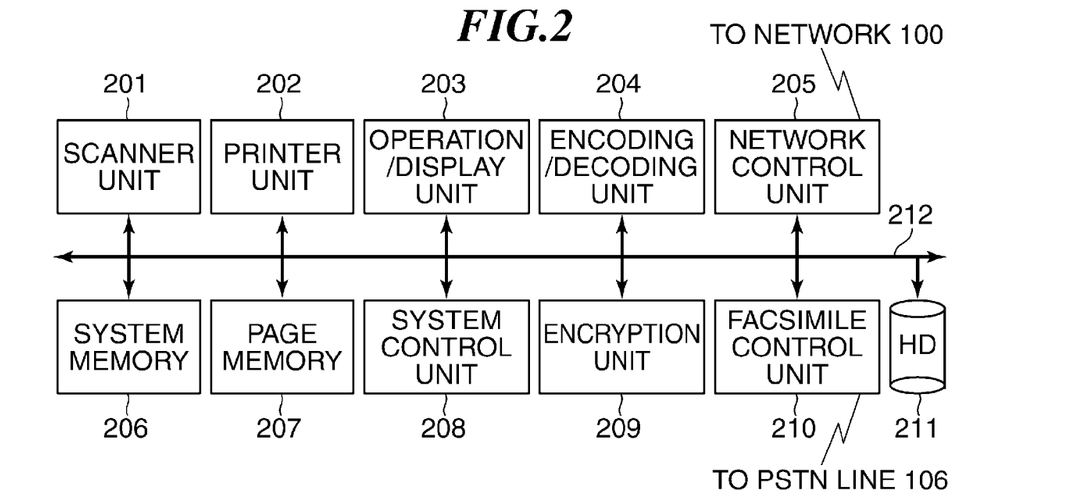
FIG. 2 is a block diagram showing the construction of the receiver image processing apparatus.

FIG. 2 shows in block diagram the construction of the receiver image processing apparatus 105.

Referring to FIG. 2, reference numeral 201 denotes a scanner unit for reading an original in a specified mode (e.g., with a specified sheet size, resolution, and density). A printer unit 202 has a plurality of sheet feed units in which and from which sheets of different sizes (such as A4, A3, and B4 size sheets) can be stored and fed. The printer unit 202 is able to perform printing on sheets fed from any of the sheet feed units, using print setting information specified by a user through an operation/display unit 203. In the print setting, post-processing such as stapling, folding, and punching can be specified. In other words, the printer unit 202 has a function of a post-processing apparatus for performing post-processing on sheets. The printer unit 202 decides whether to perform the post-processing based on the print setting information set by the user through the operation/display unit 203 and stored into an HD 211.

The print setting information is not limited to one input through the operation/display unit 203. The print setting information can be input by the user using a browser on the host computer 101, or can be acquired by the image processing apparatus 105 from another image processing apparatus via the network 100, or can be acquired by the apparatus 105 from a card, which is capable of being carried by the user and which has a short distance wireless communication function.

The operation/display unit 203 is used by the user to perform various setting operations, and displays, e.g., an operation state of the image processing apparatus 105. Specifically, the operation/display unit 203 has a touch panel, hard keys, etc., displays various user interface screens to accept user's requests, and displays information representing an error that has occurred in the image processing apparatus 105.

An encoding/decoding unit 204 is for encoding and compressing transmission image information and for decoding and decompressing received compressed data to restore original image information. A network control unit 205 is connected to the network 100 shown in FIG. 1, and inputs and outputs information from and to other network-connected devices.

A system memory 206 includes a RAM and a ROM, and stores information registered in advance in the image processing apparatus 105. A page memory 207 is used to develop image information of one page when transmission data is encoded and reception data is decoded by the encoding/decoding unit 204.

A system control unit 208 monitors and controls respective parts of the image processing apparatus 105, which are shown in FIG. 2, and is implemented by a microcomputer.

An encryption unit 209 is for encrypting image data to be stored into the HD 211. In the case of image data to be stored without being encrypted, the image data is encoded by the encoding/decoding unit 204 and the encoded image data is stored into the HD 211 as it is. On the other hand, in the case of image data to be stored after being encrypted, the image data is encoded by the encoding/decoding unit 204, is encrypted by the encryption unit 209, and is then stored into the HD 211.

A facsimile control unit 210 is connected to the PSTN line 106, and communicates via the PSTN line 106 with the facsimile machine 107 and other image processing apparatuses. The HD (hard disk) 211 is implemented by a nonvolatile memory, and stores print setting information, received data, scanned data, etc.

It should be noted that the printing method of the printer unit 202 is not limited. For example, an electrophotographic method, ink jet method or the like can be used. As printing sheets, there can be mentioned cut sheets and a roll sheet (later cut into sheets). The image processing apparatus 105 is not limited to the MFP, but can be a printer having a facsimile communication function.

Figure 3:
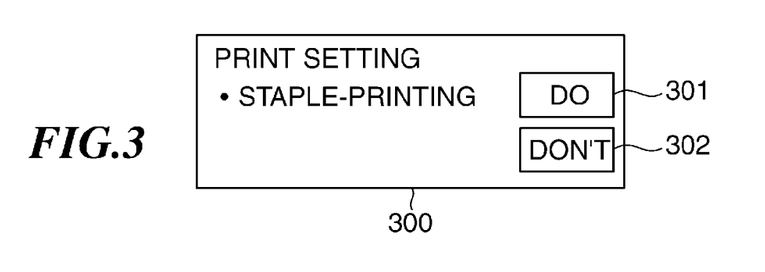
FIG. 3 is a view showing a staple-printing setting field of a print setting screen displayed on an operation/display unit of the receiver image processing apparatus.

FIG. 3 shows an example of a user interface (UI) screen displayed on the operation/display unit 203, which is shown in FIG. 2. In FIG. 3, there is only shown a staple printing-related setting field of a print setting screen displayed in a user mode of the image processing apparatus 105.

As shown in FIG. 3, a "Do" button 301 and a "Don't" button 302 are displayed in the staple-printing setting field of the print setting screen 300. When the "Do" button 301 or the "Don't" button 302 is pressed by the user, the operation/display unit 203 accepts a user's instruction (staple-printing setting information) given by the button operation. Under the control of the system control unit 208, the staple-printing setting information is stored into a nonvolatile memory such as the HD 211. At power-on, the staple-printing setting information is loaded into a predetermined region of the system memory 206, whereby the system control unit 208 is able to determine whether or not the staple-printing should be performed.

Figure 4:
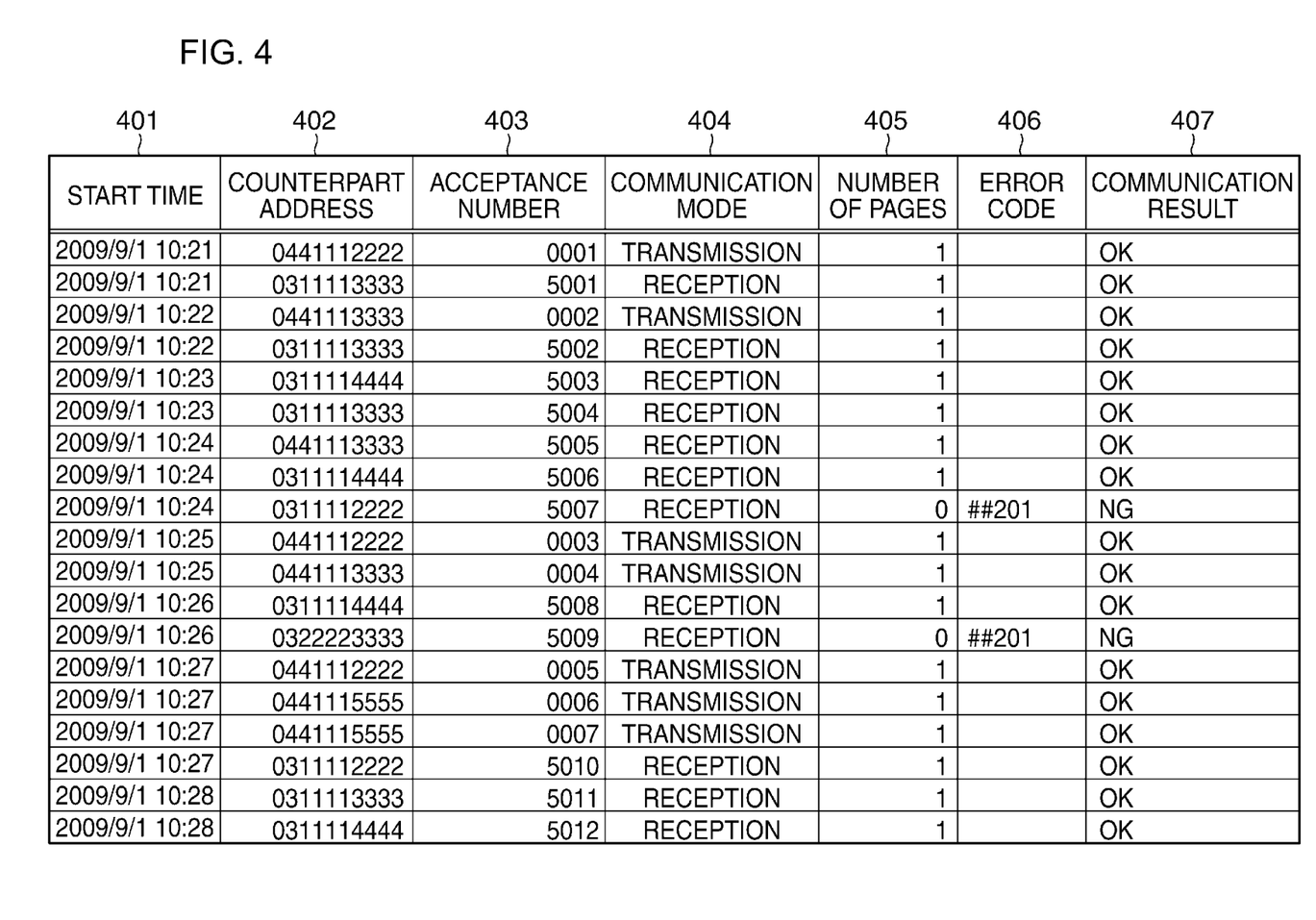
FIG. 4 is a view showing a communication history table held in a holding unit of the receiver image processing apparatus.

FIG. 4 shows an example of a communication history table 400 held as communication history information in the HD 211. It should be noted that items of the communication history information are not limited to those shown in the communication history table 400.

As shown in FIG. 4, the communication history table 400 includes a plurality of records (histories). Each record includes a start time field 401 that stores information representing a time at which a facsimile transmission or facsimile reception was started. A counterpart address field 402 stores a counterpart address information such as a telephone number of a communication counterpart apparatus.

An acceptance number field 403 stores a number assigned by the image processing apparatus 105 to each communication. For example, the number assigned to transmission is incremented from 0001 after each communication and the number assigned to reception is incremented from 5002 after each communication.

A communication mode field 404 stores information representing a communication mode such as transmission or reception. A "number of pages" field 405 stores information representing the number of pages transmitted from or received by the image processing apparatus 105. A communication error code filed 406 stores an error code representing a type of communication error. A communication result field 407 stores a value of OK representing successful communication or a value of NG representing communication failure.

Figure 5:
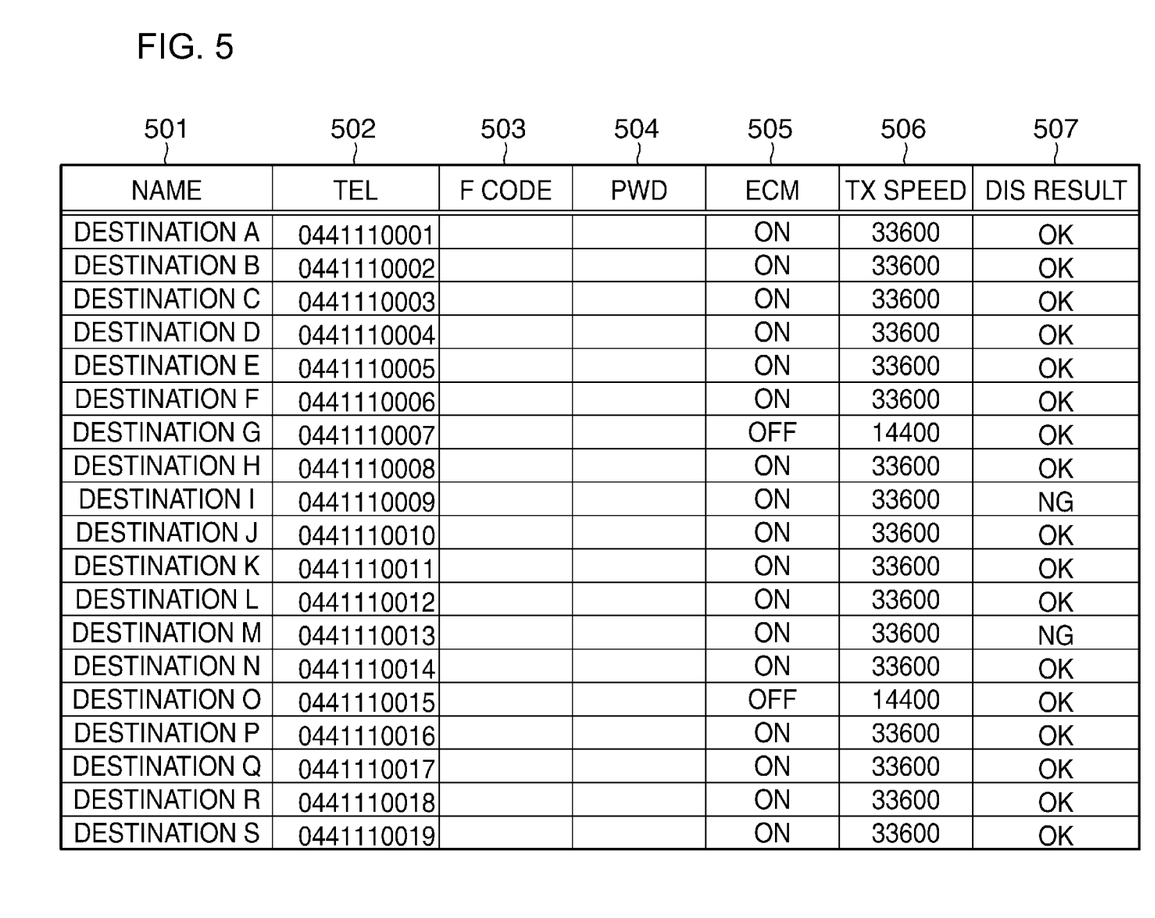
FIG. 5 is a view showing a destination information table held in the holding unit.

FIG. 5 shows an example of a destination information table 500 held as communication history information in the HD 211 shown in FIG. 2. It should be noted that items of the communication history information are not limited to those shown in the destination information table 500. This example holds the communication history such that a communication error is associated with a telephone number notified at arrival of an incoming call from a sender apparatus.

As shown in FIG. 5, the destination information table 500 includes a plurality of records. Each record includes a name field 501 that stores counterpart name information. A destination information field (TEL field) 502 stores a telephone number and/or address information of a counterpart apparatus. In this example, only a telephone number is held.

An F code field 503 stores F code information of 20 digits at the maximum, and a PWD filed 504 stores password information of 20 digits at the maximum. An ECM field 505 stores a value of ON in the case of ECM communication where error recovery is performed, and stores a value of OFF in the case of non-ECM communication where error recovery is not performed.

A TX speed field 506 stores information about transmission start speed at the start of communication. A value of 33600 represents facsimile communication performed according to the V. 34 procedure, and a value of 14400 represents facsimile communication performed according to the V. 17 procedure.

A DIS result field 507 stores a value of OK, if communication with a sender image processing apparatus has been successfully completed in a case that the receiver image processing apparatus issued a DIS command for declaring A4 sheet size, and stores a value of NG, if the communication has been erroneously completed. The value in the DIS result field 507 is used for the next communication with the same sender apparatus. Based on whether the DIS result field 507 (corresponding to the sender telephone number) has a value of OK or NG, the facsimile control unit 210 specifies a sheet size to be notified to the sender image processing apparatus. More specifically, at the next communication, the facsimile control unit 210 determines the value in the DIS result filed 507 in accordance with a determination process, which will be described later with reference to FIG. 9. If it is determined in the determination process that a value of OK is stored in the DIS result field 507, a DIS command declaring A4 sheet size is issued as in the preceding communication. If it is determined that a value of NG is stored in the DIS result field 507, e.g., A4, B4, and A3 sheet sizes are declared according to the ability of the receiver image processing apparatus 105. The facsimile control unit 210 notifies a DIS command declaring the sheet sizes to the counterpart apparatus.

It should be noted that a result of determination by the facsimile control unit 210 in the determination process that a value of OK is stored in the DIS result field 507 indicates that the post-processing function of the receiver image processing apparatus can effectively be utilized.

Figure 6:
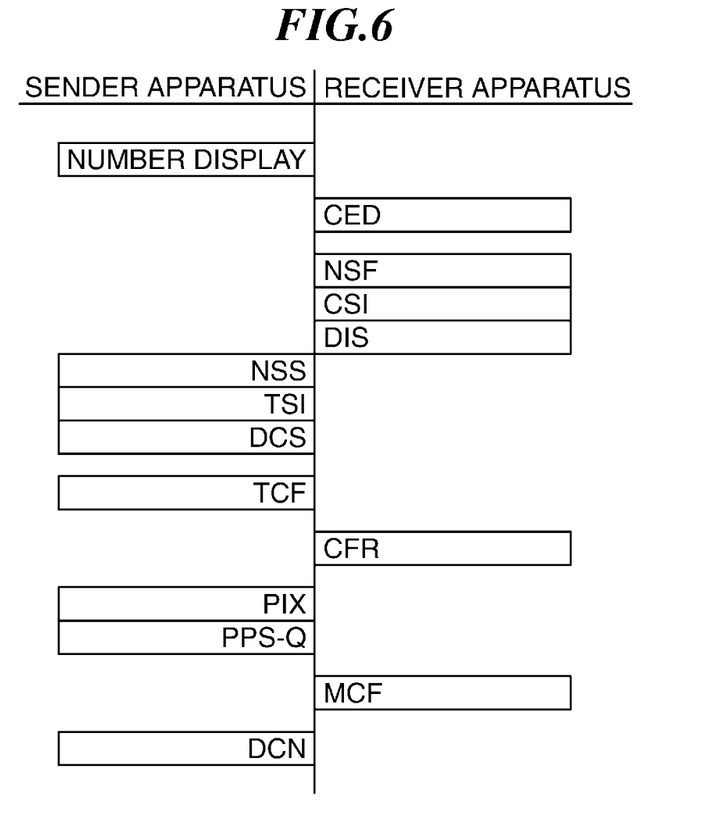
FIG. 6 is a view showing a communication protocol between image processing apparatuses at normal communication.

FIG. 6 shows a facsimile communication protocol between image processing apparatuses at normal communication.

In this example, at the time of facsimile communication, the facsimile control unit 210 of the receiver image processing apparatus 105 acquires, as telephone number information of the sender image processing apparatus, calling number display information notified from the public network, and delivers a CED signal as a response to an incoming call.

Next, the facsimile control unit 210 delivers a DIS signal, CSI signal, and NSF signal as ability information of the receiver image processing apparatus 105. In response to this, the sender image processing apparatus delivers, as transmission instruction information, a DCS signal, TSI signal, and NSS signal to the receiver image processing apparatus 105, and delivers a training signal TCF as test image data.

The receiver image processing apparatus 105 delivers a CFR signal, if the communication is to be continued after reception of the TCF signal. The sender image processing apparatus that receives the CFR signal delivers image data PIX and a PPS-Q signal indicating a terminal end of the image data.

When normally receiving the image data PIX and the PPS-Q signal, the receiver image processing apparatus delivers an MCF signal. Finally, after receiving the MCF signal, the sender image processing apparatus delivers a DCN signal indicating the end of communication, thereby completing the series of facsimile communication.

Figure 7:
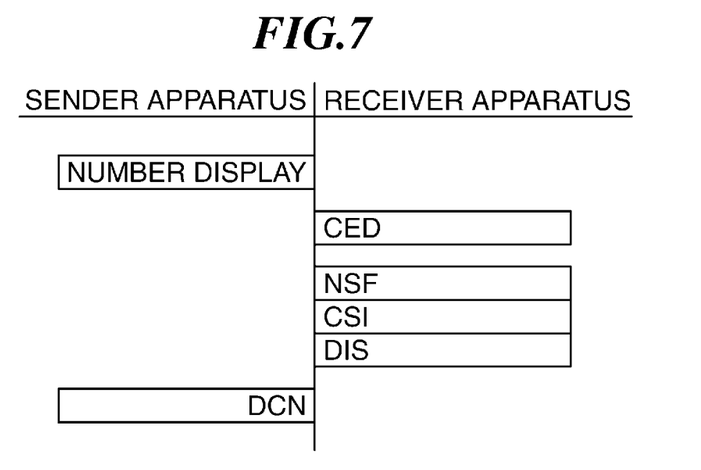
FIG. 7 is a view showing a communication protocol between image processing apparatuses at occurrence of error.

FIG. 7 shows a facsimile communication protocol between image processing apparatuses at occurrence of error.

In this example, at the time of facsimile communication, the facsimile control unit 210 of the receiver image processing apparatus 105 acquires, as telephone number information of the sender image processing apparatus, calling number display information notified from the public network, and delivers a CED signal as a response to an incoming call.

Next, the facsimile control unit 210 delivers a DIS signal, CSI signal, and NSF signal as ability information of the receiver image processing apparatus 105. Based on the received signals (ability information), the sender image processing apparatus determines whether the receiver image processing apparatus 105 has an ability to execute a process in line with an instruction intended to be transmitted from the sender image processing apparatus.

In the above determination, it is sometimes determined that the DIS signal indicates that A4 size sheets can be used in the receiver image processing apparatus, whereas the instruction intended to be transmitted indicates that A3 size data should be transmitted without reduction in size. In that case, the sender image processing apparatus determines that the receiver image processing apparatus does not have an ability to execute a process in line with the instruction intended to be transmitted, and accordingly delivers the DCN signal to cause an error exit.

In the following, a description will be given of an operation of the receiver image processing apparatus 105 to notify a sheet size by means of a DIS command of facsimile communication protocol based on the print setting of the receiver image processing apparatus 105.

Figure 8:
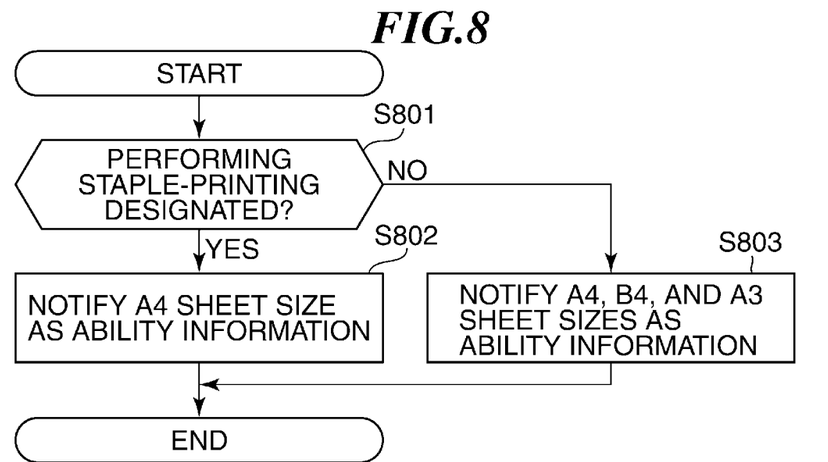
FIG. 8 is a flowchart showing a size information notification process performed by the receiver image processing apparatus.

FIG. 8 shows in flowchart a size information notification process performed by the image processing apparatus 105. In this example, the image processing apparatus 105 determines whether or not staple-printing is set based on the staple-printing setting information held in the apparatus 105, and notifies a sheet size to the sender image processing apparatus based on a result of the determination. As previously described with reference to FIG. 3, the staple-printing setting information is set by the user in the user mode. The notification process shown in FIG. 8 is realized by the facsimile control unit 210 of the image processing apparatus 105 by executing a control program stored in, e.g., the HD 211.

At arrival of an incoming call of facsimile, the facsimile control unit 210 acquires the staple-printing setting information stored in the system memory 206 and determines whether or not performing staple-printing is designated based on the acquired information (S801).

If the answer to step S801 is YES, i.e., if performing staple-printing is designated, the flow proceeds to S802.

In S802, the facsimile control unit 210 delivers, as a response to the incoming call, a DIS command for declaring the ability of the receiver image processing apparatus 105. Since performing staple-printing is designated, a declaration of A4 sheet size is notified to the counterpart apparatus. Specifically, the receiver image processing apparatus 105 recognizes that A4, B4, and A3 size sheets are stored in the sheet feed units and can be used, but declares A4 sheet size as the ability information of the receiver image processing apparatus.

By notifying the declaration of A4 sheet size from the receiver image processing apparatus 105 to the sender image processing apparatus as mentioned above, data of different size series (such as B4 size data) and data of the same size series but of different size (such as A3 size data) are made identical in size to A4 before being transmitted from the sender image processing apparatus.

As a result, it is possible for the receiver image processing apparatus 105 to cause the printer unit 202 to print the received image data onto A4 size sheets and then cause the post-processing apparatus to staple these A4 size sheets.

On the other hand, it is determined in S801 that staple-printing is not designated in the print setting information, the facsimile control unit 210 delivers a DIS command for declaring one or more sheet sizes that can be used in the image processing apparatus 105 (S803).

In a normal facsimile operation in which staple-printing is not performed, reduced size printing and A3 size printing can be made by the receiver image processing apparatus 105, and therefore, the facsimile control unit 210 declares A4, B4 and A3 sheet sizes. In that case, the sender image processing apparatus is able to perform data transmission with A4, B4 and A3 sizes.

According to this embodiment, when image data received via facsimile are subjected to staple-printing, A4 sheet size is declared by means of a DIS command. As a result, a series of image data are made identical in size to A4 and then transmitted from the sender image processing apparatus, and therefore it is possible to prevent a situation that makes it impossible to perform staple-printing due to data size inconsistency and to improve the finished quality of printing.

Since the sender image processing apparatus sends a series of data previously made identical in size to A4, it is possible to shorten communication time and to reduce communication fees.

Second Embodiment

The receiver image processing apparatus 105 according to a second embodiment of this invention is configured, at arrival of an incoming call of facsimile, to declare a sheet size by means of a DIS command based on dial information (e.g., number display information) of the sender image processing apparatus notified from the communication network, various settings of the receiver image processing apparatus, and communication error histories.

In this example, the receiver image processing apparatus 105 decides a sheet size to be notified to the sender image processing apparatus based on communication history information held in a record corresponding to the telephone number of the sender image processing apparatus notified at arrival of an incoming call. In a case where a communication error has not occurred in the preceding communication with the same sender image processing apparatus, post-processing can be performed and accordingly the facsimile control unit 210 of the receiver image processing apparatus 105 notifies a declaration of A4 sheet size to the sender image processing apparatus.

On the other hand, if a communication error has occurred in the preceding communication with the same transmission image processing apparatus, the facsimile control unit 210 notifies a declaration of A4, A3 and B4 sheet sizes to the sender image processing apparatus. In that case, post-processing will not be performed on sheets.

Figure 9:
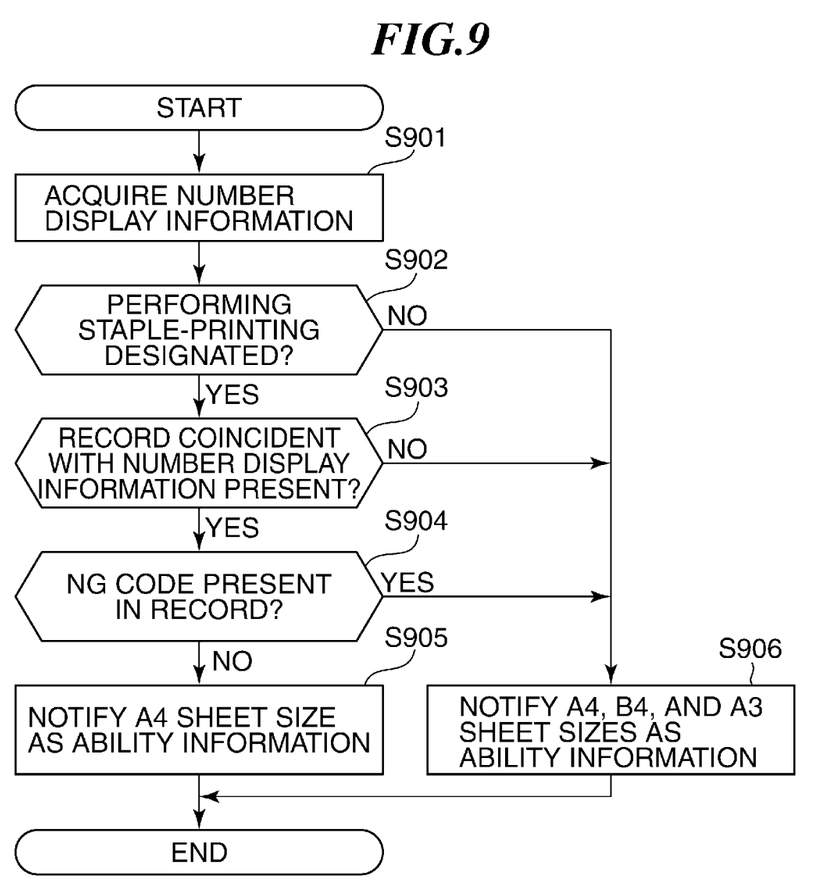
FIG. 9 is a flowchart showing a size information notification process performed by the receiver image processing apparatus according to a second embodiment of this invention.

FIG. 9 shows in flowchart a size information notification process performed by the receiver image processing apparatus 105. This notification process is realized by the facsimile control unit 210 of the apparatus 105 by executing a control program stored in, e.g., the HD 211.

Upon arrival of an incoming call of facsimile, the facsimile control unit 210 acquires number display information notified from the public communication, as dial information of the sender image processing apparatus (S901). Next, in S902, the facsimile control unit 210 acquires staple-printing setting information stored in the system memory 206 and determines based on the acquired information whether or not performing the staple-printing is designated.

If it is determined in S902 that performing staple-printing is designated, the flow proceeds to S903.

In S903, the facsimile control unit 210 determines whether a record whose counterpart address field 402 stores address information (telephone number) coincident with the dial information of the sender image processing apparatus acquired in S901 is present in the history information table 400 stored in the system memory 206. If it is determined that such a record is present in the history information table 400, the flow proceeds to S904.

In S904, the facsimile control unit 210 determines whether an NG code representing error exit is stored in the communication result field 407 of the record.

The NG code held in the communication result field 407 does not indicate an operation error of the receiver image processing apparatus 105, but indicates that a disconnection signal DCN is received from the sender image processing apparatus in response to a DIS command (ability information) delivered from the receiver image forming apparatus 105 in the facsimile communication protocol shown in FIG. 7.

Accordingly, the size information notification process is continued, even if it is determined in S904 that the NG code is stored in the communication result field 407 of the record corresponding to the telephone number of the sender image processing apparatus.

In S903, the facsimile control unit 210 is able to determine whether a record whose destination information field 502 stores a telephone number coincident with dial information of the sender image processing apparatus is present in the history information table 500, instead of searching through the history information table 400.

If it is determined in S903 that such a record is present in the history information table 500, the facsimile control unit 210 determines in S904 whether a value of NG is stored in the DIS result field 507 of the record.

If the answer to S904 is NO, the facsimile control unit 210 delivers to the sender image processing apparatus a DIS command declaring A4 sheet size as the ability information of the receiver image processing apparatus (S905), and completes the present process.

By notifying the declaration of A4 sheet size from the receiver image processing apparatus 105 to the sender image processing apparatus, data of different size series (such as B4 size data) and data of the same size series but of different size (such as A3 size data) are made identical in size to A4 before being transmitted from the sender image processing apparatus, whereby staple-printing can be performed by the receiver image processing apparatus.

If the answer to S902 or S903 is NO or if the answer to S904 is YES, the flow proceeds to S906 where the facsimile control unit 210 delivers to the sender image processing apparatus a DIS command that declares a sheet size corresponding to the ability information of the receiver image processing apparatus, whereupon the present process is completed.

In a normal facsimile operation in which staple-printing is not performed, reduced size printing and A3 size printing can be made by the receiver image processing apparatus 105, and therefore, the facsimile control unit 210 declares A4, B4 and A3 sheet sizes. Accordingly, the sender image processing apparatus is able to perform data transmission with A4, B4 and A3 sizes.

With the above-described embodiment, if an error exit is caused by sheet size inconsistency, the communication error is held as a communication history, whereby an error recovery function is achieved at the next communication from the same sender apparatus. Specifically, a sheet size different from the sheet size declared at the preceding communication is declared, whereby the receiver image processing apparatus is able to receive data even from a sender image processing apparatus incapable of reducing image size.

Third Embodiment

The receiver image processing apparatus 105 according to a third embodiment of this invention is configured to discriminate, at arrival of an incoming call, whether or not a transfer mode is set, acquire print setting of a transfer destination image processing apparatus if the transfer mode is set, and notify, instead of the transfer destination image processing apparatus, A4 sheet size to a sender image processing apparatus if performing staple-printing is designated in the print setting.

Specifically, the facsimile control unit 210 determines whether performing staple-printing is designated in the print setting of the transfer destination image processing apparatus, and based on a result of the determination, declares a sheet size by means of a DIS command of the facsimile communication protocol.

Figure 10:
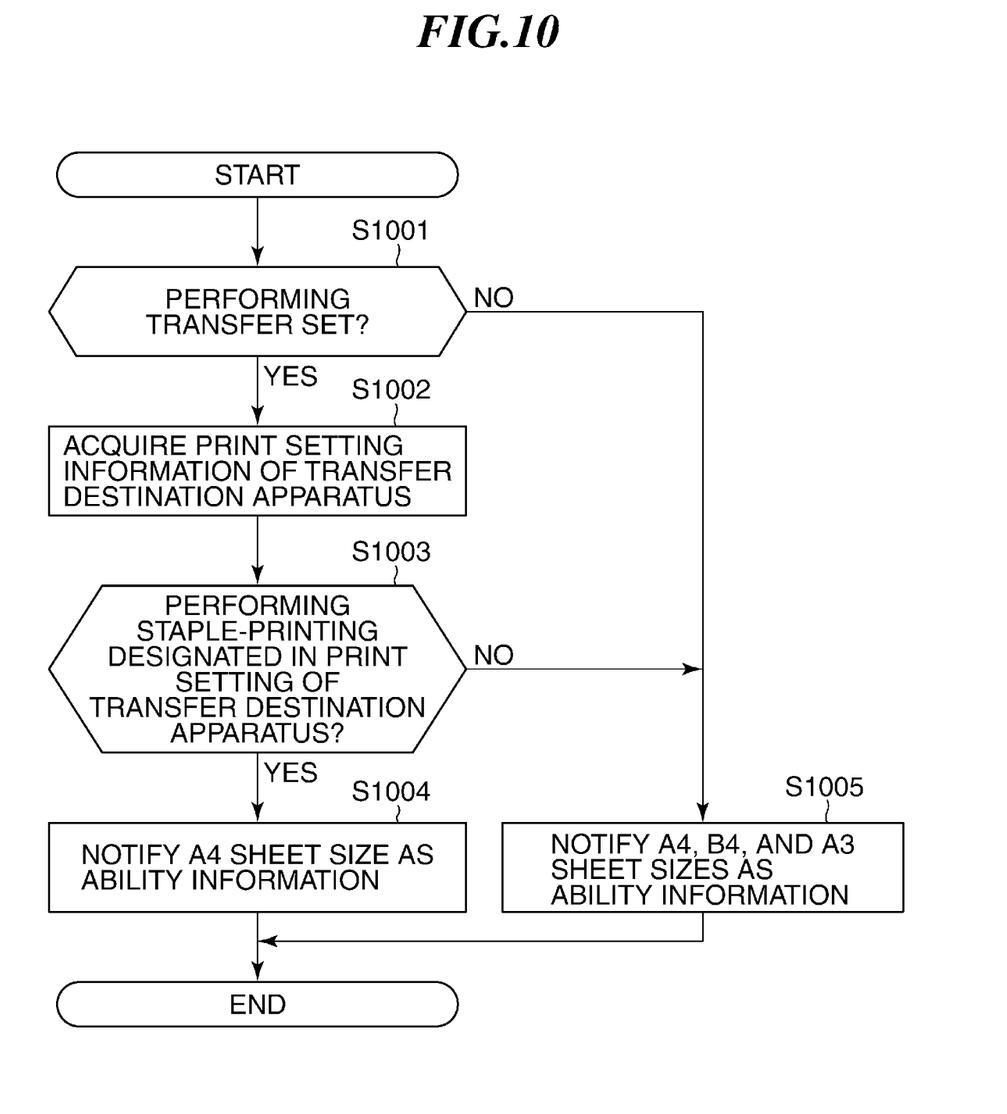
FIG. 10 is a flowchart showing a size information notification process performed by the receiver image processing apparatus according to a third embodiment of this invention.

FIG. 10 shows in flowchart a size information notification process performed by the receiver image processing apparatus 105. This notification process is performed by the facsimile control unit 210 of the apparatus 105 by executing a control program stored in, e.g., the HD 211.

At arrival of an incoming call of facsimile, the facsimile control unit 210 acquires information about transfer setting of the image processing apparatus 105 and discriminates whether or not performing transfer is set in the transfer setting (S1001). If it is determined that performing transfer is set in the transfer setting, the flow proceeds to S1002.

In S1002, the facsimile control unit 210 acquires information about print setting of the transfer destination image processing apparatus. As the print setting information, print setting information of the transfer destination image processing apparatus temporarily stored in the RAM of the system memory 206 at the time of transfer setting can be acquired. Alternatively, the print setting information of the transfer destination image processing apparatus can be directly acquired therefrom by communication via the network 100 in a case where the printer 103 or 104 or facsimile machine 104 connected via the network to the image processing apparatus 105 acts as the transfer destination image processing apparatus.

Next, in S1003, the facsimile control unit 210 determines whether performing staple-printing is designated in the print setting of the transfer destination image processing apparatus. If it is determined that performing staple-printing is designated in the print setting, the flow proceeds to S1004.

In S1004, the facsimile control unit 210 delivers a DIS command declaring A4 sheet size to the sender image processing apparatus, whereupon the present process is completed.

By notifying the declaration of A4 sheet size from the receiver image processing apparatus 105 to the sender image processing apparatus, data of different size series (such as B4 size data) and data of the same size series but of different size (such as A3 size data) are made identical in size to A4 before being transmitted from the sender image processing apparatus. As a result, the image processing apparatus 105 is able to receive image data previously made identical in size to A4 from the sender image processing apparatus and to transfer these image data to the transmission destination image processing apparatus.

On the other hand, if the answer to S1001 or S1003 is NO, the flow proceeds to S1005 where the facsimile control unit 210 delivers to the sender image processing apparatus a DIS command declaring sheet sizes (e.g., A4, B4 and A3 sizes) according to the ability information of the image processing apparatus 105 to notify the declared sizes as the ability information of the sender image processing apparatus, whereupon the present process is completed.

By notifying the declaration of, e.g., A4, B4 and A3 sheet sizes from the image processing apparatus 105 to the sender image processing apparatus, the sender apparatus is able to transmit image data without disconnecting communication due to sheet size inconsistency. The receiver image processing apparatus is able to transfer the received image data to the transfer destination image processing apparatus.

With the above-described embodiment, in a case where staple-printing is designated in the transfer destination apparatus, the image processing apparatus receives a series of data previously made identical in size to A4, and it is therefore possible to shorten communication time and to reduce communication fees in the transfer mode.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-047332, filed Mar. 4, 2010, which is hereby incorporated by reference herein in its entirety.

What is claimed is:

1. A receiver image processing apparatus configured to communicate with a sender image processing apparatus, comprising:
a processor and a memory, the processor and memory being configured to:
print data received from the sender image processing apparatus on sheets;
make a setting as to whether to perform post-processing on the printed sheets; and
notify first size information that represents-first and second sizes respectively corresponding to a first type of sheet and a second type of sheet, as ability information of the receiver image processing apparatus, to the sender image processing apparatus in a case where an incoming call arrives from the sender image processing apparatus and the setting to perform post-processing on sheets has not been made, and to notify second size information that represents the first size corresponding to the first type of sheet and does not represent the second size corresponding to the second type of sheet, as the ability information of the receiver image processing apparatus, to the sender image processing apparatus in a case where the incoming call arrives from the sender image processing apparatus and the setting to perform post-processing on sheets has been made.

2. The receiver image processing apparatus according to claim 1, the processor and memory being further configured to:
hold pieces of communication history information in each of which a telephone number notified from the sender image processing apparatus is associated with information sent back in reply to ability information notified to the sender image processing apparatus; and
judge, based on the pieces of communication history information held in said holding unit, whether there is a history indicating that an error exit was caused in communication with a telephone number notified at arrival of the incoming call from the sender image processing apparatus,
wherein the sender image processing apparatus is notified of the second size information, as the ability information of the receiver image processing apparatus, in a case where it is judged that there is no history indicating that an error exit was caused, and the sender image processing apparatus is notified of the first size information, as the ability information of the receiver image processing apparatus, in a case where it is judged that there is a history indicating that an error exit was caused.

3. The receiver image processing apparatus according to claim 1, wherein
the first size information represents size corresponding to first one of the plurality of types of sheets and size corresponding to second one of the plurality of types of sheets, and
the second size information represents size corresponding to the first one of the plurality of types of sheets and does not represent size corresponding to the second one of the plurality of types of sheets.

4. The receiver image processing apparatus according to claim 1, the processor and memory being further configured to:
in a case where the incoming call arrives, determine whether the setting to perform post processing on sheets has been made.

5. The receiver image processing apparatus according to claim 1, wherein:
the data is received from the sender image processing apparatus using a facsimile communication protocol, and
the size information is notified to the sender image processing apparatus using DIS of the facsimile communication protocol.

6. The receiver image processing apparatus according to claim 1, the processor and memory being further configured to:
store setting information indicating whether or not the setting to perform post-processing on sheets has been made,
wherein said notification unit notifies the first size information or the second size information, based on the stored setting information.

7. The receiver image processing apparatus according to claim 1, wherein the post-processing is stapling.

8. The receiver image processing apparatus according to claim 1, wherein the post-processing is stapling.

9. The receiver image processing apparatus according to claim 1, the processor and memory being further configured to:
perform the post-processing on sheets printed by said printing unit.

10. A control method for a receiver image processing apparatus including a printing unit able to print data received from a sender image processing apparatus on, and a post-processing unit for performing post-processing on sheets printed by the printing unit, comprising:
making a setting as to whether to perform post-processing on sheets;
notifying first size information that represents first and second sizes respectively corresponding to a first type of sheet and a second type of sheet, as ability information of the receiver image processing apparatus, to the sender image processing apparatus in a case where an incoming call arrives from the sender image processing apparatus and the setting to perform post-processing on sheets has not been made; and notifying second size information that represents the first size corresponding to the first type of sheet and does not represent the second size corresponding to the second type of sheet, as the ability information of the receiver image processing apparatus, to the sender image processing apparatus in a case where the incoming call arrives from the sender image processing apparatus and the setting to perform post-processing on sheets has been made.

11. A non-transitory computer-readable storage medium storing a program for causing a computer to execute the control method for a receiver image processing apparatus including a printing unit able to print data received from a sender image processing apparatus on, and a post-processing unit for performing post-processing on sheets printed by the printing unit, comprising:

making a setting as to whether to perform post-processing on sheets;

notifying first size information that represents first and second sizes respectively corresponding to a first type of sheet and a second type of sheet, as ability information of the receiver image processing apparatus, to the sender image processing apparatus in a case where an incoming call arrives from the sender image processing apparatus and the setting to perform post-processing on sheets has not been made; and notifying second size information that represents the first size corresponding to the first type of sheet and does not represent the second size corresponding to the second type of sheet, as the ability information of the receiver image processing apparatus, to the sender image processing apparatus in a case where the incoming call arrives from the sender image processing apparatus and the setting to perform post-processing on sheets has been made.

12. A receiver processing apparatus configured to receive facsimile data from a sender image processing apparatus, comprising:

a processor and a memory, the processor and memory being configured to:

print the facsimile data received from the sender image processing apparatus on sheets;

make a setting as to whether to perform post-processing on printed sheets; and notify first size information that represents first and second sizes respectively corresponding to a first type of sheet and a second type of sheet, as ability information of the receiver image processing apparatus, to the sender image processing apparatus in a case where the setting to perform post-processing on sheets has not been made, and to notify second size information that represents the first size corresponding to the first type of sheet and does represent the second size corresponding to the second type of sheet, as the ability information of the receiver image processing apparatus, to the sender image processing apparatus in a case where the setting to perform post-processing on sheets has been made.

13. The receiver image processing apparatus according to claim 12, the processor and memory being further configured to:

perform the post-processing on sheets printed by said printing unit.

14. A receiver image processing apparatus configured to communicate with a sender image processing apparatus, comprising:

a processor and a memory, the processor and memory being configured to:

determine whether a setting to perform post-processing on sheets by a transfer destination image processing apparatus, to which data received from the sender image processing apparatus is transferred, has been made;

notify first size information that represents-first and second sizes respectively corresponding to a first type of sheet and a second type of sheet, as ability information of the receiver image processing apparatus, to the sender image processing apparatus in a case where an incoming call arrives from the sender image processing apparatus, a transfer mode for transferring data received from the sender image processing apparatus to the transfer destination image processing apparatus has been made, and it is determined that the setting to perform post-processing on sheets has not been made, and notify second size information that represents the first size corresponding to the first type of sheet and does not represent the second size corresponding to the second type of sheet, as the ability information of the receiver image processing apparatus, to the second image processing apparatus in a case where the incoming call arrives from the sender image processing apparatus, the transfer mode has been made, and it is determined that the setting to perform post-processing on sheets has been made.

15. The receiver image processing apparatus according to claim 14, the processor and memory being further configured to:

discriminate whether the transfer mode has been made.

16. The receiver image processing apparatus according to claim 14, the processor and memory being further configured to:

acquire print setting information about print setting of the transfer destination image processing apparatus, and determine whether the setting to perform post-processing on sheets by the transfer destination image processing has been made in the print setting.

17. The receiver image processing apparatus according to claim 16, wherein the print setting information is acquired from the transfer destination image processing apparatus.

18. The receiver image processing apparatus according to claim 14, wherein the first size information represents size corresponding to first one of the plurality of types of sheets and size corresponding to second one of the plurality of types of sheets, and the second size information represents size corresponding to the first one of the plurality of types of sheets and does not represent size corresponding to the second one of the plurality of types of sheets.

19. The receiver image processing apparatus according to claim 14, wherein:

the data is received from the sender image processing apparatus using a facsimile communication protocol, and the size information is notified to the sender image processing apparatus using DIS of the facsimile communication protocol.

* * * * *